United States Patent [19]

Nishimoto et al.

[11] 4,424,243
[45] Jan. 3, 1984

[54] HEAT-SHRINKABLE LAMINATE FILM

[75] Inventors: Yoshiharu Nishimoto; Kengo Yamazaki, both of Iwaki, Japan

[73] Assignee: Kureha Kagaku Kogyo Kabushiki Kaisha, Tokyo, Japan

[21] Appl. No.: 366,412

[22] Filed: Apr. 7, 1982

Related U.S. Application Data

[63] Continuation-in-part of Ser. No. 218,401, Dec. 19, 1980, abandoned.

[51] Int. Cl.³ .................. B32B 7/02; B32B 27/08; B29G 7/00; B65B 11/00
[52] U.S. Cl. .................. 428/36; 428/216; 428/516; 428/518; 428/910; 428/913; 264/176 R; 264/289.6
[58] Field of Search .............. 428/36, 516, 518, 216, 428/913

[56] References Cited

U.S. PATENT DOCUMENTS 3,524,795 8/1970 Peterson .................. 428/518
3,558,330 1/1971 Widiger et al. ............ 428/518
3,579,416 5/1971 Schrenk .................. 428/518

*Primary Examiner*—P. Ives
*Attorney, Agent, or Firm*—Wenderoth, Lind & Ponack

[57] ABSTRACT

A heat-shrinkable multilayer laminate film possessing excellent heat resistance, oil resistance and gas-barrier properties is obtained by interposing one intermediate layer of a thermoplastic resin having a crystalline melting point of from 70° to 100° C. between a core layer of a vinylidene chloride copolymer and outer surface layers of an ethylene/α-olefin copolymer having a crystalline melting point of not lower than 110° C. or a mixture of this ethylene/α-olefin copolymer and an α-olefin polymer having a crystalline melting point of from 80° to 100° C. The thus obtained laminate film can be in sheet or tubular form, and is suitable for use in packaging by heat shrinkage raw meat, processed meat, cheese and other fat-containing food. This heat-shrinkable laminate film is produced by biaxially stretching the starting laminate film at a specific temperature determined by the crystalline melting points of the resins of the intermediate layer and the outer surface layers.

10 Claims, 3 Drawing Figures

HEAT-SHRINKABLE LAMINATE FILM

REFERENCE TO RELATED APPLICATION

This is a continuation-in-part application of our co-pending Application Ser. No. 218,401, filed Dec. 19, 1980, now abandoned.

FIELD OF THE INVENTION

The present invention relates to a heat shrinkable film with high heat resistance and oil resistance comprising a core layer of a vinylidene chloride copolymer (hereinafter referred to as PVDC), outer layers of an ethylene/α-olefin copolymer having a crystalline melting point of not lower than 110° C. or a mixture of this ethylene/α-olefin copolymer and an α-olefin copolymer having a crystalline melting point of from 80° to 100° C., and one layer of an easily stretchable thermoplastic resin film interposed between the core layer and one of the outer layers, and to a process for producing the same.

BACKGROUND ART

From a commercial point of view, the most convenient mode of packaging for raw metal, processed meat, cheese and other fat-containing foods is packaging with synthetic film by heat shrinkage because such foods have irregular shapes and are often accompanied by projections such as bones and various attachments (for example, trays). The packaging material for this purpose also must have a gas-barrier property because it is required to withstand long periods of storage.

Examples of heat-shrinkable films possessing a gas-barrier property are: a PVDC film; a laminate film comprising ethylene-vinyl acetate copolymer (hereinafter referred to as EVA) layers and a PVDC layer (hereinafter referred to as EVA/PVDC/EVA film) as disclosed in Canadian Pat. No. 982,923; a tubular laminate film comprising EVA, PVDC and irradiated EVA layers (hereinafter referred to as EVA/PVDC/cross-linked EVA film) as disclosed in Japanese Patent Laid-Open Pub. No. 34565/1972; and a laminate film comprising EVA, PVDC and ionomer resin layers (hereinafter referred to as EVA/PVDC/I.O. film).

The PVDC film has certain drawbacks one of which is that additives therein such as plasticizers and stabilizers are transferred to packaged foods depending on the type of the foods, resulting in a detrimental effect from the point of view of food sanitation. Another is that the relatively large quantity of additives required to maintain cold resistance of the film lower the gas-barrier property thereof, giving rise to failure in ensuring good preservation of food.

The EVA/PVDC/EVA film comprising EVA with a vinyl acetate content of no less than 10% by weight can be easily stretched, as is disclosed in Canadian Pat. No. 982,923, but on the other hand has poor heat resistance and oil resistance. Even in the case of EVA containing less than 10% by weight of vinyl acetate, when it is used in the outermost layers of a laminate film which is in direct contact with the fat in fat-containing food, the appearance of the outermost layer may be impaired, or the surface thereof may crack when the film is subjected to heat shrinkage because of the swelling of the fat as the film has no satisfactory heat resistance and oil resistance.

In the EVA/PVDC/cross-linked EVA film, the cross-linked EVA has sufficiently high heat resistance and oil resistance as is disclosed in Japanese Patent Laid-Open Pub. No. 34565/1972, but the EVA used in the outermost layer has poor heat resistance and oil resistance. Accordingly, this type of film cannot be used satisfactorily for packaging fat-containing food since fat or oil unavoidably adheres to the outermost layer in the packaging process. On the other hand, it is difficult from a technological viewpoint to apply cross-linkd EVA on both sides of the film. If the opposite sides are irradiated, PVDC is also irradiated, since radiation is transmissible, and is liable to decompose. Further, an irradiation chamber entails considerable installation cost and also requires troublesome maintenance and operation.

The EVA/PVDC/I.O. film has eminently high stretchability and thus can be formed efficiently into laminate films. However, since the EVA and the ionomer resin have a crystalline melting point of not higher than 100° C., the heat resistance and oil resistance of the film may not be sufficient to withstand severe conditions such as boiling and other high temperature treatments encountered while the film is in direct contact with fat-containing food. Thus, when this film is used for packaging fat-containing food of irregular shape, it is softened by fat or oil and heat when subjected to heat shrinkage and becomes thin and breaks at its concavities.

In order to obtain films possessing improved heat resistance and oil resistance, it is essential to use for the surface layers thereof a resin having excellent heat resistance and oil resistance such as an α-olefin resin having a crystalline melting point of not lower than 110° C. However, since such an α-olefin resin has poor stretchability at a stretching temperature sufficient to give satisfactory heat shrinkability, it is difficult to laminate a layer of this resin with a PVDC layer and to stretch the laminated layers. The EVA and ionomer resin having high stretchability are unsatisfactory with respect to heat resistance and oil resistance. Accordingly, there has been a need in the art for a heat-shrinkable film possessing improved heat resistance, oil resistance and gas-barrier properties which is suitable for use in packaging fat-containing food.

In general, the production of heat-shrinkable films requires a stretching step. Especially, in the case where a cylindrical film adapted for packaging is biaxially stretched by the inflation method, good inflation bubble cannot be obtained unless the film, whether it is of a single layer or of multiple layers, has tensile strength in a given range and elongation at a level higher than a given minimum value at the stretching temperature.

In order to cause the film to closely contact a food of irregular shape by heat shrinkage, it is desirable that the film have a heat-shrinkability of not less than 15% at 95° C. For this purpose it is important that the stretching be carried out at a relatively low temperature.

As a result of our extensive research concerning stetching conditions, it has been found that a laminate film having a tensile strength of from 5 to 25 Kg/cm² at 50% elongation at a relatively low temperature and an elongation of not less than 500% at the same temperature can be stretched very easily and can have a heat-shrinkability of not less than 15% at 95° C.

As has been mentioned previously, the EVA, ionomer resin, and the like, have suitable tensile strength and elongation at breakage and can be easily stretched at the stretching temperature thereof, but, because of their poor heat resistance and oil resistance, it is necessary to use for the outer surface layers an α-olefin resin having a crystalline melting point of not lower than 110° C. in order to obtain a laminate film possessing improved heat resistance and oil resistance. However, since a stretching temperature at which a heat- and oil-resistant resin exhibits a tensile strength of from 5 to 25 Kg/cm² at 50% elongation is relatively high, a heat-shrinkability of not less than 15% at 95° C. cannot be obtained. If this resin is stretched at a lower temperature, its tensile strength will be so increased that stretching of the resin becomes difficult.

SUMMARY OF THE INVENTION

A principal object of the present invention is to provide a heat-shrinkable laminate film having improved heat resistance, oil resistance and gas-barrier properties, which can be produced by stretching at a relatively low temperature.

The laminate film according to the present invention comprises the following layers (A), (B), and (C) in laminated state and possesses heat resistance, oil resistance and gas-barrier properties while having a heat-shrinkability of not less than 15% at 95° C.:

(A) a core layer of a vinylidene chloride copolymer resin;

(B) outer surface layers of a polymer selected from the group consisting of ethylene/α-olefin copolymers having crystalline melting points of not lower than 110° C., and mixtures each comprising not less than 20% by weight of one of said ethylene/α-olefin copolymers and not more than 80% by weight of an α-olefin polymer having a crystalline melting point of from 80° to 100° C.; and (C) one intermediate layer of a thermoplastic resin having a crystalline melting point of from 70° to 100° C. interposed between the core layer (A) and one of the surface layers (B), the sum of the thicknesses of the layers (B) being from 1/5 to ½ of the total thickness of the layers (B) and (C).

After repeated experiments, we have found that, by providing a layer of thermoplastic resin (C) having a crystalline melting point of from 70° to 100° C. between a core layer of PVDC (A) and an outer surface layer comprising the ethylene/α-olefin copolymer (B), and limiting the ratio of the thickness of the surface layers (B) to that of the thermoplastic resin layer (C) having high stretchability within a specific range, the composite film of the layer comprising the ethylene/α-olefin copolymer resin layer and the stretchable thermoplastic resin layer can be easily stretched at a relatively low temperature. By stretching the layer (B) comprising the ethylene/α-olefin copolymer resin with the resin layer (C), it is possible to stretch the layer (B) satisfactorily at a temperature considerably lower than its crystalline melting point.

Another object of the present invention is to provide a process for producing the heat-shrinkable laminate film described above.

The stretching temperature varies depending on the thicknesses of the component films of the laminate film and the crystalline melting points of the constituent resins. Particularly when an ethylene/α-olefin copolymer having a crystalline melting point of not lower than 110° C. was used as a constituent as in the present invention, it was extremely difficult to determine the stretching temperature.

However, we have found that, if the laminate film is stretched at a temperature in the specific range determined by the crystalline melting point and the thickness of each of the constituent resins of the layers (B) and (C), the tensile strength of the film at 50% elongation will fall within the range of from 5 to 25 Kg/cm² and the elongation thereof will be so large that the film can be stretched very easily.

Thus, the process for producing the heat-shrinkable laminate film in accordance with the present invention comprises laminating by extrusion (A) a core layer of a vinylidene chloride copolymer resin, (B) outer surface layers of a polymer selected from the group consisting of ethylene/α-olefin copolymers having crystalline melting points of not lower than 110° C., and mixtures each comprising not less than 20% by weight of one of said ethylene/α-olefin copolymers and not more than 80% by weight of an α-olefin polymer having a crystalline melting point of from 80° to 100° C., and (C) one intermediate layer of a thermoplastic resin having a crystalline melting point of from 70° to 100° C. interposed between the core layer (A) and one of the surface layers (B) so that the sum of the thicknesses of the layers (B) will be from 1/5 to ½ of the total thickness of the layers (B) and (C); quenching the laminate thus obtained; and then biaxially stretching the laminate at a temperature ranging from $(T_B H_B + T_C H_C)/(H_B + H_C)$°C., wherein $T_B$ and $T_C$ are the melting points of the polymer constituting the layers (B) and the thermoplastic resin constituting the layer (C) respectively expressed in °C., and $H_B$ and $H_C$ are the thicknesses of the same resin layers (B) and the resin layer (C) respectively expressed in μ, to a temperature 15° C. lower than this temperature.

When the layer (B) comprises a mixture of two or more resins, the crystalline melting point $T_B$ is determined as the weighted mean of the crystalline melting points of the constituent resins.

Further, in the case where two layers (B) comprise different constituent resins and have different thicknesses, $T_B H_B$ is represented by the formula $T_{B1} H_{B1} + T_{B2} H_{B2}$ wherein each of $T_{B1}$ and $T_{B2}$ is the crystalline melting point of an individual constituent resin and each of $H_{B1}$ and $H_{B2}$ is the thickness of an individual layer.

Outside the temperature range specified above, the desired tensile strength and elongation cannot be obtained at the stretching temperature, nor can a satisfactory inflation bubble be formed when the laminate film is subjected to the inflation method. Accordingly, it becomes impossible to stretch the laminate film.

The nature, utility and further features of the present invention will be more clearly understood from the following detailed description when read in conjunction with the accompanying drawing.

DETAILED DESCRIPTION OF THE INVENTION

Figure 1:
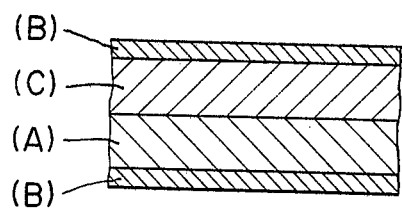
FIG. 1 is a fragmentary, enlarged sectional view showing the laminate structure of one example of a laminate film according to this invention in which an intermediate layer (C) is interposed between the core (A) and only one outer layer (B)

The vinylidene chloride copolymer constituting the core layer (A) is a copolymer comprising 65 to 95% (by weight, as in all percentages and parts set forth hereinafter) of vinylidene chloride and 5 to 35% of one or more unsaturated monomers copolymerizable therewith.

Examples of unsaturated monomers copolymerizable with the vinylidene chloride are vinyl chloride, acrylonitrile, and alkyl acrylates having 1 to 18 carbon atoms in the alkyl group.

If desired, conventional plasticizers and stabilizers may be added to the vinylidene chloride resin.

It is preferable that the thickness of the core layer (A) be 4 to 20 $\mu$.

The outer surface layers (B) comprise an ethylene/$\alpha$-olefin copolymer having a crystalline melting point of not lower than 110° C. or a mixture of not less than 20% of this ethylene/$\alpha$-olefin copolymer and not more than 80% of an $\alpha$-olefin polymer having a crystalline melting point of from 80° to 100° C. The crystalline melting point herein means the temperature indicating the maximum heat absorbance on the melting curve obtained by measuring 8 mg of a polymer sample by means of a differential scanning calorimeter (Model IB, mfd. by Perkin-Elmer Company) at a temperature rise rate of 8° C./min.

Examples of ethylene/$\alpha$-olefin copolymers having a crystalline melting point of not lower than 110° C. are copolymers of ethylene and a minor proportion (1.0 to 30%) of an $\alpha$-olefin having not more than 18 carbon atoms such as butene-1, pentene-1, 4-methylpentene-1, hexene-1, and octene-1 such as "Ultzex" (trade name) and "Neozex" (do) supplied by Mitsui Sekiyu-Kagaku K.K. (Mitsui Petrochemical Co., Ltd., Japan), "Dowlex" (do) supplied by the Dow Chemical Co. and the like which are generally called linear low-density polyethylenes (L-LDPE). Copolymers of ethylene and an $\alpha$-olefin having 5 to 14 carbon atoms having a limiting viscosity of 0.8 to 4.0 and a density of 0.900 to 0.950, especially 0.900 to 0.940, are especially preferred. These copolymers are obtained by polymerization in the presence of a catalyst predominantly comprising a transition metal, and are easily stretchable while having a relatively high crystalline melting point, tough and excellent in antistress-cracking property. The nature and method for production of these copolymers per se are more precisely disclosed in, e.g., Japanese Patent Pub. No. 92887/1978, the disclosure of which is intended to be incorporated herein by reference.

The outer surface layers (B) may consist solely of the above described ethylene/$\alpha$-oelfin copolymer having a crystalline melting point of not lower than 110° C., but a resin mixture of 20 to 99%, preferably 20 to 80%, of this ethylene/$\alpha$-olefin copolymer and 80 to 1%, preferably 80 to 20%, of an $\alpha$-olefin polymer having a crystalline melting point of from 80° to 100° C. was found to have improved stretchability and thus to be preferable. In particular, a mixture of these two resins was found to have better oil resistance and heat resistance as well as higher stretchability than a single $\alpha$-olefin polymer having the mean crystalline melting point of the two resins.

The term "$\alpha$-olefin polymer" used herein indicates a homopolymer of or a copolymer predominantly comprising an $\alpha$-olefin. Among $\alpha$-olefin polymers having a crystalline melting point of from 80° to 100° C., $\alpha$-olefin copolymers predominantly comprising $\alpha$-olefin such as EVA, ethylene-alkyl acrylate copolymers (esters having an alkyl group of 1 to 6 carbon atoms being particularly preferable), and ionomer resins are preferred. EVA containing 2 to 12% of vinyl acetate is especially preferred.

The laminate film of the present invention must comprise one layer of the thermoplastic resin (C), and it is preferable that this layer (C) have a thickness of not less than 5$\mu$ which can affect the $\alpha$-olefin polymer layer (B).

The sum of the thicknesses of the resin layers (B) is from 1/5 to ½ of the total thickness of the resin layers (B) and (C). If this sum is less than 1/5, heat resistance will be poor so that the film may rupture, for example, at the concavities of packaged article, while a sum in excess of ½ lowers the effect of the layer (C) whereby stretching of the laminate becomes difficult. Although the total thickness of the layer is not specifically limited, a thickness of 20 to 100$\mu$ is preferred from the point of view of economy and storage stability.

For the thermoplastic resin (C), EVA, ethylene-alkyl acrylate copolymers (esters having an alkyl group of 1 to 6 carbon atoms being particularly preferable), isoprene-styrene block copolymers, butadiene-styrene block copolymers, 1,2-polybutadiene, and ionomer resins, i.e., ionic copolymers obtained by neutralizing anions in copolymers of $\alpha$-olefins such as ethylene and propylene and unsaturated carboxylic acids such as acrylic acid, methacrylic acid and maleic acid with metal ions such as $Na^+$, $K^+$, $Mg^{2+}$, $Ca^{2+}$, $Zn^{2+}$, and $F^{2+}$, especially those having a crystalline melting point of from 70° to 100° C. are used singly or in a mixture. EVA containing 5 to 20% of vinyl acetate and 1,2-polybutadiene are preferably used.

The layer (C) of the thermoplastic resin listed above is interposed between the core layer (A) and either one of the two outer surface layers (B) as shown in FIG. 1. If the layer (C) is interposed between the core layer (A) and the outer surface layer (B), delamination of layers will not readily occur.

An $\alpha$-olefin polymer is intrinsically incompatible with PVDC, so that the laminate formed from these polymers is liable to delaminate. However, improved adhesiveness can be obtained by interposing a layer of a thermoplastic resin (C) between the layers of the above stated polymers.

In order to facilitate stretching of the $\alpha$-olefin polymer, it is preferable that the layers adhere to each other, and the thermoplastic resin layer (C) can be interposed between the respective layers as in adhesive layer according to necessity. The thermoplastic resin layer (C), when used as an adhesive layer, has preferably a thickness of not exceeding 3$\mu$.

For the thermoplastic resin used for this purpose, conventional resins for bonding purposes such as EVA or olefin resins modified, for example, with carboxylic acids among the resins enumerated earlier are used. As long as the adhesive resin has the properties of the thermoplastic resin (C), the adhesive layer is included in the thermoplastic resin layer (C) in the calculation of the thickness of the layer.

The laminate film according to the present invention is fabricated by extruding the constituent resins into tubular form through an extruder adapted for the number of layers to be laminated with the use of an annular die as disclosed in Japanese Laid-Open Pub. No. 82888/1978 which is incorporated herein by reference, or into sheet form by means of a T-die, and laminating the thus obtained resin in tubular or sheet form inside or outside the die.

In the case where two or more layers (C) of the above-mentioned thermoplastic resin are used, one or more additional unit of extruders should be used because, if the resin is caused to diverge into two or more layers in a single unit of extruder, it will be difficult to control the proportion of each layer of the resin.

Figure 2:
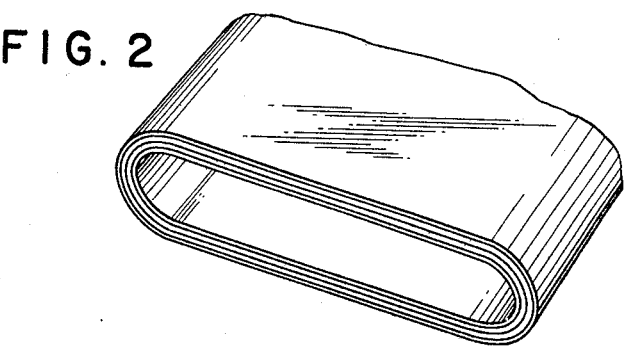
FIG. 2 is a fragmentary perspective view of one example of a heat-shrinkable laminate film of tubular form according to this invention.

The tubular laminate is once quenched directly below the die, folded by means of nip rolls, heated over a hot water tank maintained at a given temperature, and then stretched by simultaneous biaxial inflation in the longitudinal and circumferential directions to obtain a tubular heat-shrinkable film as shown in FIG. 2.

The laminate in sheet form, on the other hand, is once quenched by means of chilled rolls disposed directly below the die, heated to a given temperature, and stretched first in the flow direction between rolls and then in the width direction by a tenter, or stretched biaxially in the flow and width directions at the same time by a tenter to obtain a heat-shrinkable film.

The laminate film of the present invention is preferably fabricated in tubular form from the viewpoint of ease and convenience in packaging.

Figure 3:
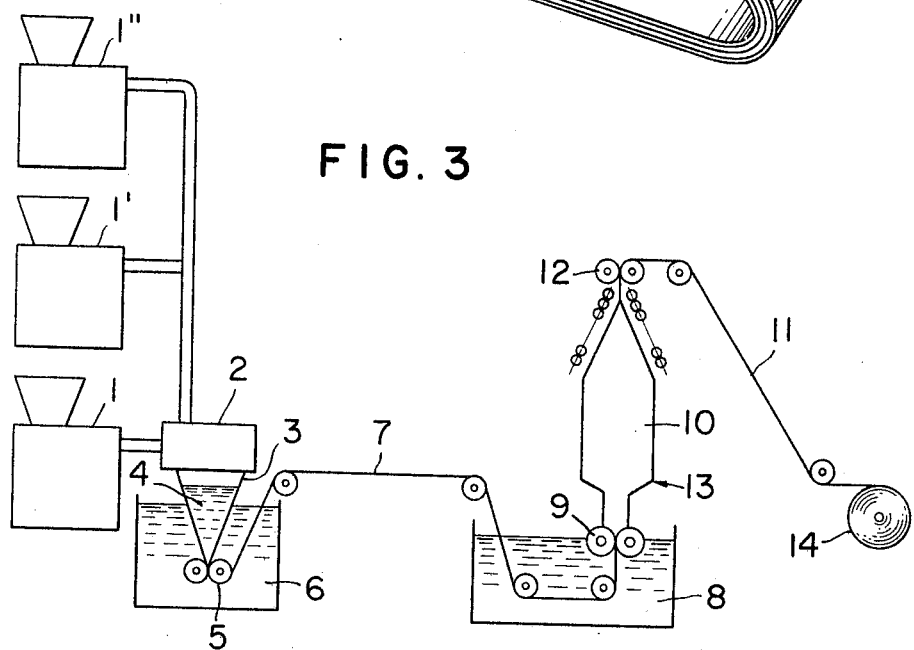
FIG. 3 illustrates a layout of an apparatus for producing heat-shrinkable tubular films in accordance with the process of the present invention.

Hereinafter, one embodiment of a process for producing tubular film according to the present invention will be described with reference to FIG. 3.

A laminated film according to the present invention is produced by at least three extruders.

A tubular laminate 3 extruded by three or more extruders 1, 1', 1" . . . (of which only three extruders are shown) through an annular die 2 is immediately cooled in a cooling liquid in a tank 6 maintained at a temperature not higher than 40° C. The laminate 3 thus cooled is nipped and drawn up by a pair of nip rolls 5 provided in the cooling tank 6 as a liquid 4 sealed in the tubular laminate 3 to prevent close adhesion between the inner surfaces thereof is continuously squeezed. Thus, a flatly folded continuous tubular structure 7 is formed and passes through a hot water tank or an oven 8, the temperature of which is controlled to be several degrees to 20° C., ordinarily about 5° C., higher than the stretching temperature. The tubular structure is then passed through a pair of nip rolls 9 provided in the hot water tank or oven. The continuous tubular structure 7 is heated in the hot water tank or oven, or by a combination of the tank and an oven depending on the desired stretching temperature. Thereafter, the tubular structure 7 is cooled in an atmosphere of room temperature between the nip rolls 9 and another pair of nip rolls 12 rotating at a speed several times that of the nip rolls 9 while air is sealed in the tubular structure 7 so that a bubble will be continuously formed, and stretched by biaxial inflation in the longitudinal and transverse directions respectively by degrees of stretching that are one and a half or more, preferably two or more, times, whereupon a heat-shrinkable tubular film 11 is obtained and taken up on a roll 14.

The stretching temperature herein refers to the temperature at the portion 13 just prior to the formation of a bubble. The temperature was measured by an infrared radiation thermometer Model 12-8781 (mfd. by Nippon Burns, K.K., Japan).

The PVDC layer (A) which has been rendered into an amorphous state by quenching can be easily stretched, and the adhesive layer bonded to other layers according to necessity can also be easily stretched because it is thin.

The $\alpha$-olefin copolymer layer (B) which is difficult to stretch, upon heating to the stretching temperature, can also be stretched by virtue of the easily stretchable thermoplastic resin (C).

Thus, a biaxially oriented heat-shrinkable film having a heat-shrinkability of not less than 15% (in each of the two directions) at 95° C. can be obtained easily.

The heat-shrinkable stretched film obtained in accordance with the present invention possesses heat resistance, oil resistance and a gas-barrier property, and is advantageously used particularly for packaging food of irregular shape.

In order to indicate more fully the nature and utility of this invention, the following specific examples of practice constituting preferred embodiments of the invention and comparison examples are set forth, it being understood that these examples are presented as illustrative only and not intended to limit the scope of the invention.

EXAMPLES 1 THROUGH 11 AND COMPARISON EXAMPLES 1 THROUGH 5

Table 1 shows the properties of the polymers used in the examples.

Molten resins (polymers) were extruded by three to five units of extruders through an annular coextrusion die 2 and formed into a desired tubular laminate structure.

This tubular laminate structure was cooled in a cooling tank 6 maintained at a temperature of 15° C., and formed into a tubular structure having a flat width of 120 mm and a thickness of 600$\mu$. This tubular structure was filled with soybean oil 4 up to substantially the same level as the surface of the cooling water filling the cooling tank 6 in order to prevent close adhesion between the inner surfaces of the structure.

The tubular structure 7 was then heated for about 12 seconds as it was transferred at a rate of 5 m/min. through the hot water tank 8 and/or heat oven 8' (for Examples 6 and 7), the temperature of which was controlled at the stretching temperatures shown in Table 2, and the tubular structure thus heated was passed through the first pair of nip rolls 9 of a rotational speed of 5 m/min.

The tubular structure 7, while being cooled in an atmosphere at room temperature, was stretched with a stretch ratio of three in the longitudinal direction until it passed the second pair of nip rolls 12 rotating at a speed of 15 m/min. and, at the same time, was swollen 3.3 times with respect to the diameter thereof by the air fed into the tubular structure 10, i.e., stretched in the transverse direction. The biaxially stretched film had a width of about 360 mm in flat folded state and a thickness of about 60$\mu$.

The laminate films obtained in the examples are listed in Table 2. The methods of measuring the properties of the films and the data obtained are set forth in Tables 3 and 4, respectively.

TABLE 1

| Symbol | Type or Trade Name of Polymer | Melt Index (dg/min) | Density (g/cc) | Copolymer (wt. %) | Crystalline Melting Point (°C.) | Remarks |
|---|---|---|---|---|---|---|
| a | EVA | 6 | 0.94 | 19[*4] | 80 | Used as an adhesive |
| b | EVA | 0.6 | 0.94 | 15[*4] | 83 | |
| c | EVA | 0.5 | 0.93 | 10[*4] | 92 | |
| d | EVA | 0.5 | 0.927 | 5[*4] | 99 | |
| $d_1$ | EVA | 2.0 | 0.93 | 5[*4] | 97 | |
| e | Ethylene/α-olefin copolymer[*1] | 2.5 | 0.922 | — | 122 | |
| f | Ethylene/α-olefin copolymer[*2] | 2.6 | 0.935 | — | 123 | |
| g | Ethylene/α-olefin copolymer[*6] | 1.8 | 0.935 | — | 122 | |
| $g_1$ | Low-density polyethylene | 1.2 | 0.925 | — | 110 | |
| h | Ethylene-ethyl acrylate | 6 | 0.93 | 18[*5] | 89 | |
| i | 1,2-polybutadiene | 3 | 0.91 | — | 87 | |
| j | PVDC[*3] | | | | | |

[*1]Ultzex (Mitsui Petrochemical): linear low-density polyethylene
[*2]Ultzex (Mitsui Petrochemical): linear low-density polyethylene
[*3]VDC/VC = 80/20 with 1 part of epoxide soybean oil
[*4]Vinyl acetate content
[*5]Ethyl acrylate content
[*6]Neozex (Mitsui Petrochemical): linear low-density polyethylene

TABLE 2

| | Composition of Layer — Figures in parentheses indicate thickness in μ | | | | | | | Stretching temperature (°C.) | $\frac{T_B H_B + T_C H_C}{H_B + H_C}$ (°C.) |
|---|---|---|---|---|---|---|---|---|---|
| | 1st layer | 2nd layer | 3rd layer | 4th layer | 5th layer | 6th layer | 7th layer | | |
| Exam. 1 | e(5) | — | b(36) | — | j(8) | a(0.7) | e(10) | 84 | 94 |
| Exam. 2 | e(7) | — | b(36) | — | j(8) | a(0.7) | e(8) | 84 | 94 |
| Exam. 3 | g(6) | — | b(36) | — | j(8) | a(0.7) | g(9) | 89 | 94 |
| Exam. 4 | f(7) | a(0.7) | j(8) | a(0.7) | h(36) | a(0.7) | f(8) | 99 | 99 |
| Exam. 5 | f(5) | a(0.7) | j(8) | a(0.7) | i(36) | a(0.7) | f(10) | 96 | 97 |
| Exam. 6 | f(5) | a(0.7) | d(40) | a(0.7) | j(8) | a(0.7) | f(5) | 102 | 103 |
| Exam. 7 | f(5) | a(0.7) | j(8) | a(0.7) | d(36) | a(0.7) | f(10) | 105 | 106 |
| Exam. 8 | $e/d_1 = 5/5(12)$[*1] | — | a(1) | j(10) | — | b(25) | $e/d_1 = 5/5(12)$ | 86 | 101 |
| Exam. 9 | $e/d_1 = 6/4(11)$ | — | a(1) | j(10) | — | b(26) | $e/d_1 = 6/4(12)$ | 87 | 101 |
| Exam. 10 | $g/d_1 = 2/8(10)$ | — | a(1) | j(8) | a(1) | b(30) | $g/d_1 = 2/8(10)$ | 85 | 96 |
| Exam. 11 | g/b = 8/2(5) | b/c = 5/5(30) | — | j(9) | a(1) | — | g/b = 8/2(15) | 92 | 105 |
| Comp. Exam. 1 | b(12) | — | — | — | j(8) | — | b(40) | 82 | — |
| Comp. Exam. 2 | d(10) | b(15) | — | j(10) | — | b(15) | d(10) | 84 | — |
| Comp. Exam. 3 | f(12) | — | — | a(0.7) | j(8) | a(0.7) | f(39) | 122 | — |
| Comp. Exam. 4 | b(7) | — | j(8) | a(0.7) | e(36) | — | b(8) | 118 | — |
| Comp. Exam. 5 | $g_1/d_1 = 6/4(4)$ | b(21) | a(1) | j(8) | a(1) | b(21) | $g_1/d_1 = 6/4(4)$ | 83 | — |

[*1]$e/d_1 = 5/5$ indicates a 5/5 mixture of resins e and $d_1$. The symbols $g/d_1$, g/b and the like have similar meanings.

TABLE 3: METHOD OF MEASUREMENT

Hot Water Shrinkability

20 sheets of film, each cut into a square measuring 10 cm × 10 cm, were caused to shrink in loose state in a hot water bath at a temperature of 95° C. for 3 min., and the linear shrinkage factors of each of the films in the longitudinal and transverse directions with respect to the original dimensions thereof were measured. The minimum and maximum values obtained are shown in Table 4.

Oil Resistance & Heat Resistance

Lard was intentionally floated on the surface of water of 95° C. or boiling water in a hot water bath. Bacon vacuum-packaged with a film sample was dipped into the water for 5 min. and then cooled. The outermost layer of the film was then examined for damage at the concavities and smooth portions of the bacon.

Gas-Barrier Property

The gas-barrier property of each film sample was measured by means of Model OX-100 manufactured by Moder Controls Inc. at 30° C. and 100% RH.

Stretchability

The stretchability of each film was measured under the conditions of actual stretching procedure.

TABLE 4

| | Stretchability | Shrinkability (%) | Oil-resistance Heat-resistance | | Gas-barrier property (cc/cm² · day · atm) |
|---|---|---|---|---|---|
| | | | Smooth portion | Concavities | |
| Exam. 1 | O | 45–48 | O | O | 48 |
| Exam. 2 | O | 45–47 | O | O | 48 |
| Exam. 3 | O | 42–46 | O | O | 48 |
| Exam. 4 | O | 31–34 | O | O | 48 |
| Exam. 5 | O | 33–37 | O | O | 48 |
| Exam. 6 | O | 23–27 | O | O | 48 |
| Exam. 7 | O | 19–24 | O | O | 48 |
| Exam. 8 | O | 45–48 | O | O | 42 |
| Exam. 9 | O | 41–45 | O | O | 42 |
| Exam. 10 | O | 43–48 | O | O | 48 |
| Exam. 11 | O | 25–30 | O | O | 45 |
| Comp. Exam. 1 | O | 50–52 | X | X | 48 |
| Comp. Exam. 2 | O | 46–51 | X | X | 42 |
| Comp. | Δ | 3–8 | O | O | 48 |

TABLE 4-continued

| | Stretch-ability | Shrink-ability (%) | Oil-resistance Heat-resistance | | Gas-barrier property (cc/cm² · day · atm) |
|---|---|---|---|---|---|
| | | | Smooth portion | Concavities | |
| Exam. 3 Comp. Exam. 4 | O | 6-12 | X | O | 48 |
| Comp. Exam. 5 | O | 49-53 | O | X | 48 |

Stretchability:
O: Stably stretchable (at least 100 m of a stretched film can be produced continuously).
Δ: Less stably stretchable (10 to 100 m of a stretched film can be produced continuously).
X: Non-stretchable (no longer than 10 m of a stretched film can be produced continuously).
Oil Resistance & Heat Resistance:
O: No deterioration observed.
Δ: Deterioration observed in part.
X: Tearing observed.

The data shown in the above Table were obtained at the optimum stretching temperatures for both the examples and the comparison examples.

As is apparent from the examples, the laminate film according to the present invention could be easily stretched at a temperature ranging from $(T_B H_B + T_C H_C)/(H_B + H_C)°C.$ to a temperature 15° C. lower than this temperature and had a heat-shrinkability of not less than 15% at 95° C. as well as excellent heat resistance and oil resistance.

Comparison Examples 1 and 2 which related to laminate films each comprising EVA containing 5 to 15% of vinyl acetate in the outer layer exhibited poor heat resistance and oil resistance.

Comparison Example 3 comprising an ethylene/α-olefin copolymer in the outermost layers, while possessing satisfactory heat resistance and oil resistance, required stretching at an elevated temperature because this film did not comprise one intermediate layer of a thermoplastic resin. Further, this film showed less stable stretchability and a lower heat-shrinkability.

Comparison Example 4 comprising a layer of an ethylene/α-olefin copolymer interposed between a core layer and outermost layers of EVA having a smaller thickness than the ethylene/α-olefin copolymer layers could not be stretched except at an elevated stretching temperature and thus had a lower shrinkability as well as poorer heat resistance and oil resistance.

Comparison Example 5 wherein the outermost layers were relatively thin had insufficient heat resistance at the concavities of the packaged article.

What is claimed is:

1. A heat-shrinkable laminate film having heat resistance, oil resistance, gas-barrier properties and a heat-shrinkability of not less than 15% at 95° C. which comprises:

(A) a core layer of a vinylidene chloride copolymer resin;
(B) outer surface layers of linear low-density polyethylene polymers selected from the group consisting of ethylene/α-olefin copolymers having crystalline melting points of not lower than 110° C. and mixtures each comprising not less than 20% by weight of one of said ethylene/α-olefin copolymers and not more than 80% by weight of an α-olefin polymer having a crystalline melting point of from 80° to 100° C.; and
(C) one intermediate layer of a thermoplastic resin having a crystalline melting point of from 70° to 100° C. interposed between the core layer (A) and one of the surface layers (B),
the sum of the thicknesses of the layers (B) being from 1/5 to 178 of the total thickness of the layers (B) and (C).

2. A laminate film as claimed in claim 1, wherein the layers (B) comprise an ethylene/α-olefin copolymer having a crystalline melting point of not lower than 110° C.

3. A laminate film as claimed in claim 1, wherein the layers (B) comprise a mixture of 20 to 99% by weight of an ethylene/α-olefin copolymer having a crystalline melting point of not lower than 110° C. and 80 to 1% by weight of an α-olefin polymer having a crystalline melting point of from 80° to 100° C.

4. A laminate film as claimed in claim 1, wherein the ethylene/α-olefin copolymer is a copolymer of ethylene and one or more α-olefins selected from the group consisting of butene-1, pentene-1, 4-methylpentene-1, hexene-1, and octene-1.

5. A laminate film as claimed in claim 3, wherein the α-olefin polymer having a crystalline melting point of from 80° to 100° C. is a copolymer of ethylene and vinyl acetate or an alkyl acrylate.

6. A laminate film as claimed in claim 1, wherein the thermoplastic resin constituting the layer (C) is a resin having a crystalline melting point of from 70° to 100° C. and is selected from the group consisting of ethylene-vinyl acetate copolymers, copolymers of ethylene and alkyl acrylates having 1 to 6 carbon atoms in the alkyl group, isoprene-styrene block copolymers, 1,2-polybutadienes, ionomer resins, and mixtures thereof.

7. A laminate film as claimed in claim 6, wherein the thermoplastic resin constituting the layer (C) is an ethylenevinyl acetate copolymer containing 5 to 20% by weight of vinyl acetate.

8. A laminate film as claimed in claim 1, wherein the thickness of said film is 20 to 100μ.

9. A laminate film as claimed in claim 1, wherein said film is in tubular form.

10. A laminate film as claimed in claim 1, wherein said ethylene/α-olefin copolymer constituting the surface layers (B) is a copolymer of ethylene and 1.0 to 30% of an α-olefin having not more than 18 carbons.

* * * * *

UNITED STATES PATENT AND TRADEMARK OFFICE
CERTIFICATE OF CORRECTION

PATENT NO.  : U.S.P. 4,424,243
DATED       : January 3, 1984
INVENTOR(S) : Yoshiharu Nishimoto et al.

It is certified that error appears in the above-identified patent and that said Letters Patent is hereby corrected as shown below:

Column 12, line 17 from "1/5 to 178"

to -- 1/5 to 1/2 --.

Signed and Sealed this

Ninth Day of October 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,424,243
DATED : January 3, 1984
INVENTOR(S) : NISHIMOTO et al

It is certified that error appears in the above-identified patent and that said Letters Patent is hereby corrected as shown below:

On the Title Page, add the following:

--[30]   Foreign Application Priority Data
   Dec. 25, 1979   [JP]   Japan   168579/1979
   Aug. 21, 1980   [JP]   Japan   115123/1980 --

Signed and Sealed this

Twenty-fifth Day of July, 1989

Attest:

DONALD J. QUIGG

Attesting Officer

Commissioner of Patents and Trademarks